Patented Apr. 12, 1932

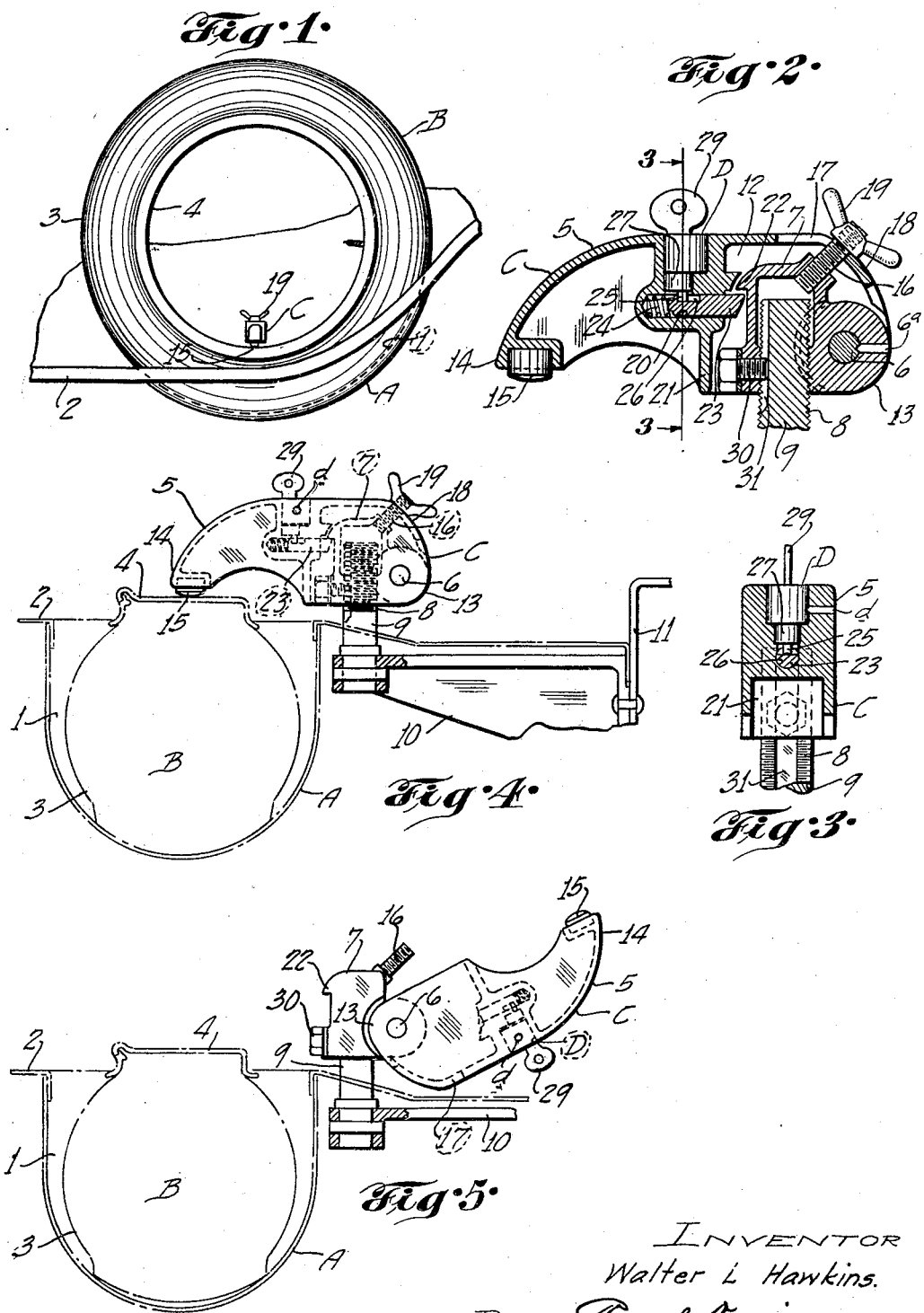

1,854,137

UNITED STATES PATENT OFFICE

WALTER L. HAWKINS, OF ST. LOUIS, MISSOURI, ASSIGNOR, BY MESNE ASSIGNMENTS, TO DURO METAL PRODUCTS COMPANY, OF CHICAGO, ILLINOIS, A CORPORATION OF ILLINOIS

SPARE WHEEL OR TIRE LOCK

Application filed September 24, 1928. Serial No. 307,888.

This invention relates generally to locks for automobile spare parts.

Many automobiles of present standard construction are equipped with spare wheels or tires which are carried upon the fenders. For such purpose, the fenders are provided with what are commonly designated as "wells", which may hence be described as tire supports or carriers embodied or incorporated in the automobile or other like vehicle and commonly include a U-shaped pocket or recess adapted for treadwise partial reception of a spare-tire or wheel assembly.

My present invention has particular reference to a device for lockably retaining a spare tire or wheel assembly in such a so-called "fender well" of an automobile or other vehicle and has for its chief object the provision of a device for efficiently locking such spare-wheel or tire against unauthorized removal.

My invention has for a further object the provision of such a locking device which comprises few parts, which may be readily and inexpensively manufactured, which may be easily installed upon the automobile or other vehicle, which is compact and durable in structure, which is conveniently operable, and which is efficient in the performance of its intended functions.

And with the above and other objects in view, my present invention resides in the novel features of form, construction, arrangement, and combination of parts hereinafter described and pointed out in the claims.

In the accompanying drawings,—

Figure 1 is a fragmentary side view of a fender equipped with a tire-supporting well and a lock of my invention showing a spare wheel or tire assembly mounted in the well and retained therein by the lock;

Figure 2 is an enlarged sectional view through the lock, the supporting post thereof being broken away;

Figure 3 is a sectional view along the line 3—3, Figure 2;

Figure 4 is a view of the lock shown in tire-retaining position in association with a fender-well and its contained wheel-assembly, as indicated by dot-dash lines; and Figure 5 is a view similar to Figure 4, but showing the retaining arm unlocked and swung away from the well for permitting removal of the spare wheel or tire assembly.

Referring now more in detail and by reference characters to the drawings, which illustrate a preferred embodiment of the invention, A designates a tire-support of the type known as a "fender-well", which includes an arcuate pocket or recess 1 formed preferably with a U-shaped or other cross-section, conformable with the contour of the standard tire, in the usual fender 2 of an automobile or other vehicle, for the partial treadwise reception of a spare tire or wheel assembly B. This latter usually comprises a casing 3 and its associated so-called "demountable" rim or wheel, whether wire, disc, or artillery, 4, as best seen in Figure 1; for brevity, the same will be designated both in this specification and in the claims as the spare-wheel assembly.

My new lock, designated generally as C, is adapted to prevent the unauthorized removal of the spare-wheel assembly B from the tire support A by lockably interposing a pivoted retaining member or arm 5 in co-operation with and across the support A and adjustably spaced therefrom for embracing the wheel-assembly B therebetween, as shown in Figure 4, the arm 5 being adapted for swinging or pivotal movement in a preferably radial plane of the wheel-assembly B towards or away from the support A about a hinge pin 6 pinned or otherwise permanently fixed, as at 6a, in a tubular body-member 7 threaded, as at 8, for adjustment on a post 9 fixed on a bracket 10 extending laterally from the frame 11 or other portion of the chassis of the vehicle in adjacence to the tire support A, also as best seen in Figure 4.

Preferably the arm 5 is provided at its rear or hinged end with a hood-like downwardly opening pocket or recess 12 for the protective enclosure of the body-member 7 on movement of the arm 5 to wheel-assembly retaining or closed position, as in Figure 4, the hinge-pin 6 being passed through the side walls of the recess 12 and fixed, as described, in a lug 13 forming part of the body-member 7, so that the latter will be uncovered on swinging movement of the arm 5 to wheel-assembly releasing or open position, as in Figure 5.

At its free or wheel-assembly engaging end, the arm 5 may be formed in any desired manner; preferably, however, the same includes an inverted channel shaped rounded nose 14 carrying a resilient rim-contacting pad or button 15, and for firmly clamping the arm 5 on the rim 4, an angularly-presented threaded stud 16 is permanently fixed in the body 7 in vertical adjacence to the lug 13 for projection through a slot 17 in the top or rear wall 18 of the pocket 12 of the arm 5 when the latter is in closed position, a suitable wing-nut or like threaded member 19 co-operating with the stud 16 in bearing engagement with the wall 18 for final movement of the arm 5 towards the support A to clamp the spare wheel-assembly B therebetween.

Reciprocable in a rearwardly opening bore 20 in the frontal transverse wall 21 of the pocket 12 for co-operative latching engagement with a latch lip 22 on the body-member 7, is a bolt 23 normally urged in extended position by a spring 24 seated between the frontal end wall of the bore 20 and the bolt 23, the latter being limited in its latching movement by a cam or pin 25 of a lock D suitably permanently fixed, as by a pin d, in the arm 5 for co-operation with the front and rear walls of a transverse slot 26 provided in the bolt 23. The lock D includes a cylinder or barrel 27 operable by a suitable key 29 in the usual manner well known to those skilled in the art, the cam or pin 25 being eccentrically disposed on the cylinder 27 for retraction of the bolt 23 to unlatch the arm 5 from the body 7 on proper manipulation of the key 29.

The body 7 may be rotated for axial movement on the post 9 to vary the distance between the nose 14 of the arm 5 when in its latched postion and the support A suitably to accommodate wheel-assemblies of different sizes therebetween. Having its head disposed for enclosure in the pocket 12 when the arm 5 is in latched position and threaded through one wall of the body-member 7, is a set screw 30 adapted to engage an axial slot or seat 31 in the post 9 for preventing unauthorized rotation on, and removal from, the post 9 of the body 7 and its carried arm 5.

In use, the wing nut 19 being removed from the stud 16 and the key 29 suitably manipulated to retract the bolt 23 from the lip 22, the arm 5 may be freely thrown back over the post 9 away from the support A, whereupon the wheel-assembly B may be treadwise presented in the well 1, as shown in Figure 5.

The key 29 being now removed and the bolt 23 being free to take its normally spring set extended position, the arm 5 is swung over the well 1 and its carried lip 22 then spring-wise engaged by the bolt 23, the wheel assembly B being thereby locked on the support A. The wing-nut 19 is then threaded on the stud 16 until the pad 15 firmly contacts the rim 4, the wheel-assembly B being thereby rigidly secured in the well 1, as shown in Figure 4.

It is to be understood that changes in the form, construction, arrangement, and combination, of the several parts of my new lock may be made and substituted for those herein shown and described without departing from the nature and principle of my invention.

Having thus described my invention, what I claim and desire to secure by Letters Patent is:

1. A lock for a spare-wheel assembly comprising, in combination, a post adapted for mounting on a support, a body-member mounted on the post, a wheel-engaging arm having pivoted connection with the body-member, and means for releasably retaining the arm against swingable wheel-freeing movement relatively to the post and body-member, said means including a screw mounted on the body-member and projecting through the arm when the latter is in wheel-engaging position, and an arm-engaging nut threaded on the screw.

2. A lock for a spare-wheel assembly comprising, in combination, a post adapted for mounting on a support, a body-member mounted on the post, a wheel-engaging arm having pivoted connection with the body-member, and key-actuable means for releasably retaining the arm against swingable wheel-freeing movement relatively to the post and body-member, said means including a latch-lip on the body-member and a spring-pressed key-retractable bolt mounted on the arm.

3. A lock for a spare-wheel assembly comprising, in combination, a post adapted for mounting on a support, a body-member mounted for adjustment on the post, a wheel-engaging slotted arm having pivoted connection with the body-member, a screw mounted on the body-member and adapted to project through the slot in the arm when the latter is in wheel-engaging position, a nut adapted for threaded movement on the screw to engage the arm when the latter is in wheel-engaging position, and means for releasably locking the arm against swingable wheel-freeing movement relatively to the post and body-member.

4. In combination with a support for a spare wheel-assembly, a lock including a body-member associated with said support, a retaining member pivoted to the body-member for swinging movement across said support to engage a spare wheel-assembly therebetween, and latching means incorporated in said retaining member and said body member for releasably locking said retaining member in wheel-assembly engaging position.

5. In combination with a support for a spare wheel-assembly, a lock including a body-member associated with said support, a retaining member pivoted to the body-member for swinging movement across said support to engage a spare wheel-assembly therebetween, and latching means incorporated in said retaining member and said body member for releasably locking said retaining member in wheel-assembly engaging position, said latching means including a spring bolt slidable in said retaining member, a lip incorporated in said body-member for engagement by said bolt, and means for retracting said spring bolt from engagement with said lip.

6. In combination with a carrier for a spare-wheel assembly, a lock including a rigid post associated with the carrier, a body-member disposed for vertical and horizontal adjustment upon the post, a retaining member pivoted to the body-member for swingable movement for engagement with the interposed spare wheel assembly, and means for securing the body-member in adjusted position upon the post, the retaining member including a portion, when in engagement with the spare-wheel assembly, projecting over and concealing said securing means.

In testimony whereof, I have signed my name to this specification.

WALTER L. HAWKINS.